United States Patent [19]
Rennerfelt

[11] Patent Number: 5,964,676
[45] Date of Patent: Oct. 12, 1999

[54] DEVICE FOR THE TRANSMISSION OF TORQUE

[76] Inventor: Gustav Rennerfelt, Nilstorpsvägen 53, Lidingö, Sweden, S-181 47

[21] Appl. No.: 09/091,226

[22] PCT Filed: Jan. 3, 1997

[86] PCT No.: PCT/SE97/00004

§ 371 Date: Jul. 9, 1998

§ 102(e) Date: Jul. 9, 1998

[87] PCT Pub. No.: WO97/26467

PCT Pub. Date: Jul. 24, 1997

[30] Foreign Application Priority Data

Jan. 15, 1996 [SE] Sweden ................................. 9600114

[51] Int. Cl.$^6$ .............................. F16H 1/32; F16K 31/52
[52] U.S. Cl. ................................................. 475/163
[58] Field of Search .............................................. 475/163

[56] References Cited

U.S. PATENT DOCUMENTS

| | | | |
|---|---|---|---|
| 2,545,562 | 3/1951 | Thiel, Jr. ................................. | 475/163 |
| 2,830,454 | 4/1958 | Karn ........................................ | 475/163 |
| 3,306,134 | 2/1967 | Winiarski ................................. | 475/163 |
| 4,550,630 | 11/1985 | Remus ..................................... | 475/163 |

FOREIGN PATENT DOCUMENTS

| | | |
|---|---|---|
| 501463 | 2/1995 | Sweden . |
| 502228 | 9/1995 | Sweden . |
| 503483 | 6/1996 | Sweden . |

*Primary Examiner*—Dirk Wright
*Attorney, Agent, or Firm*—Young & Thompson

[57] ABSTRACT

A device for transmitting a torque between two rotational elements (5, 2), includes an inner gear ring (24) that via only a few teeth engages an outer gear ring (23) being member of a cover (17) that is connected with one of the rotational elements (2). The axis of symmetry (A) of the gear ring (24) is oblique relative to the axis of symmetry (B) of the rotational elements (5, 2). By the aid of an eccentric portion (27) the gear ring disc (21) is imparted to perform a planetary motion along the outer gear ring (23), whereby a transmission element, that supports the inner gear ring, is subjected to a nutating motion. Between a stationary member (12) and the gear ring disc (21) a bellows (13) is provided, said bellows (13), in a hermetically tight way, separating the spaces (14,15) where the rotational elements (5, 2) are located.

12 Claims, 4 Drawing Sheets

DEVICE FOR THE TRANSMISSION OF TORQUE

TECHNICAL FIELD OF THE INVENTION

This invention relates to a device for transmitting a torque between a first driving or driven rotational element, said element being located in a first space and rotatable relative to a first stationary member, and a second driving or driven rotational element, said element being located in a second space and rotatable relative to a second stationary member, more precisely by means of a transmission element operating between said elements, said first and second spaces being separated from each other via a tight separating means.

BACKGROUND OF THE INVENTION AND PRIOR ART

The grounds for this invention are the sealing problems that relate to valve spindles. Rotatable as well as axially movable valve spindles are in practice often sealed by gland or radial sealings. These sealings include a set of rings that via a washer and a number of screws are compressed axially in order to expand radially and thus create a sealing between the spindle and a surrounding valve housing. However, the sealing is worn and consequently the sealing pressure decreases eventually. A regular follow-up draft of the screws is thus required. Sometimes spring washers beneath the heads of the screws are used to give a more long-lasting axial prestressing of the set of rings. For certain types of valves O-ring sealings are also used. These sealings have the disadvantage that the valve must be dismounted when the O-ring is to be exchanged.

Common for prior art valve sealings is that a relative movement takes place in the interface between the sealing material and the spindle. This means that the sealing will never become hermetically tight in absolute terms and as soon as the sealing is worn its sealing ability is reduced gradually. In e.g. the process industry, like chemical industry, there are very high demands upon valve tightness since fluids, whose flows are regulated by means of a valve, may be toxic as well as corrosive. A leaking gas valve, e.g. at an oil rig, may cause catastrophes.

Hermetically tight valves that use metal bellows are known for such valves where the valve operation is effected by an axial movement only, e.g. sliding valves and seat valves. In such a case the valve spindle at its outer end is provided with a thread that cooperates with a journalled nut that upon rotation causes the spindle to move axially. Inside of the thread and the nut a metal bellows is provided and it is possible to secure said metal bellows both to the spindle and the surrounding valve housing in a hermetically tight way due to the fact that the spindle moves only axially, i.e. without rotating. For other types of valves, e.g. ball valves, cap valves and revolving butterfly valves, it is necessary when operating said valves that the spindle is rotated or turned. This makes it impossible to secure a bellows hermetically tight to the spindle. The operation of said valves often requires that high torques are transmitted from the driving source in question to the rotatable spindle and the adherent valve body.

From a narrow aspect the aim of the invention is to realize a device that manages to transmit also high torques to a rotatable valve spindle simultaneously as the spindle is kept separated from the surroundings by means of a separating means that is hermetically tight. From a most general aspect the aim of the invention is to create a device for transmitting a torque that could be used wherever a rotational element is to transmit a torque to another rotational element simultaneously as the elements are kept apart by means of a hermetically tight separating means.

A device as generally defined in the preamble for transmitting a rotary motion is previously known for other purposes than operation of valve spindles. This known device has two rotational elements that consist of input and output shafts that are rotatably journalled in opposite walls of a housing that is placed in a partition between two separated spaces. The transmission element consists of a rigid arm that is pivotally journalled by means of a ball and socket joint located between the ends of the arm, the opposite ends of the arm being hingedly connected with discs on the input and output shafts respectively; more precisely in such a way that the arm transmits a rotary motion with a gear change of 1:1 from the input shaft to the output shaft. The arm is provided with a plate to which an end of a conically shaped bellows is tightly secured, the opposite end of the bellows also being tightly secured to one of said walls in the housing.

For several reasons it is not in practice possible to use a device of the last-mentioned type for transmitting high torques between input and output rotational elements, e.g. in a valve, simultaneously as hermetical sealing is guaranteed. Thus the bellows is moving with large strokes; this means that the bellows must not be made out of materials, e.g. metallic materials, that are resistant to high pressures. Further the arm that takes care of the transmission of rotation of the input shaft to the output shaft has such weak dimensions that it is not at all possible to transmit higher torques. Still further the structure does not allow fine adjustment of the output rotational element in different setting positions.

OBJECTS AND FEATURES OF THE INVENTION

As mentioned above, in its most general aspect the invention aims at creating a device for transmitting a torque that manages to transmit considerable torques between two rotational elements, one of which is driving and the other one is driven, simultaneously as these elements are to be located in spaces that are separated from each other by means of hermetically tight separating means. A further aim is to create such a device that manages to resist considerable compressive forces without demolition or damage of the separating means. Still an aim is to create a torque transmitting and simultaneously hermetically sealing device that manages to resist the influence of even extremely aggressive and/or toxic fluids without demanding a complicated or expensive design. It is also an aim to create a device that claims only a minimal room, e.g. in connection with a valve spindle.

According to the invention at least the basic aim is realized by the characteristics defined in the characterizing clause of claim 1. Preferred embodiments of the invention are defined in the dependent claims.

BRIEF DESCRIPTION OF THE APPENDED DRAWINGS

In the drawings:

FIG. 1 is an illustration, partly in view, partly in section of a valve design that includes a device according to the invention for transmitting a torque, FIG. 2 is an enlarged, schematical longitudinal section through the device according to the invention only, said device being shown in horizontal position, FIG. 3 is a transverse section III—III in FIG. 2, FIG. 4 is a schematical longitudinal section showing an alternative embodiment of the invention.

DETAILED DESCRIPTION OF PREFERRED EMBODIMENTS OF THE INVENTION

Figure 1:
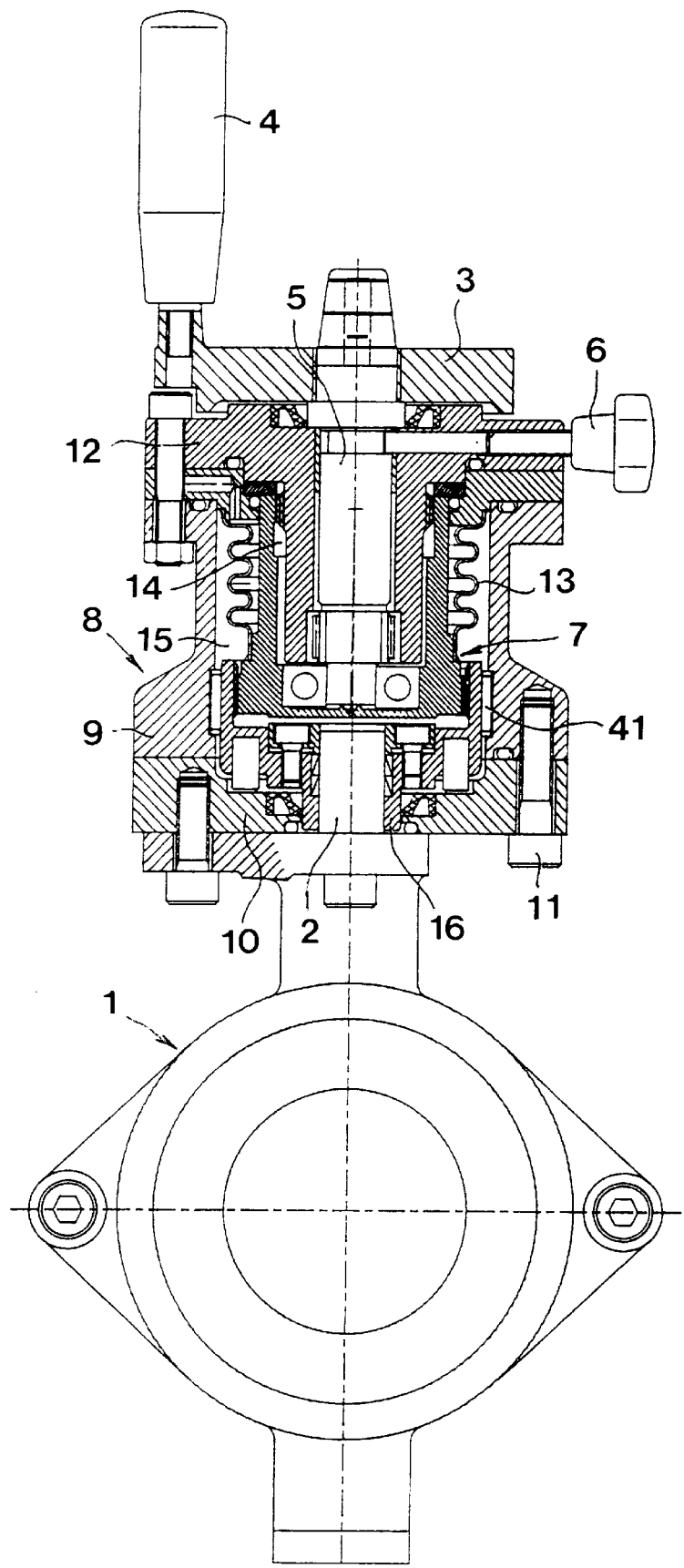

In FIG. 1 the reference numeral 1 generally designates a valve housing including a valve means (not shown), e.g. a ball, a revolving throttle or the like, said valve means for regulating purposes, being connected with a spindle or a shaft 2. In order to bring the shaft 2 to rotate there is a driving element that according to the example is in the shape of a wheel 3 having a handle 4. An input shaft 5 is connected with the wheel 3, said input shaft 5 being lockable by means of a locking element 6. A device according to the invention is inserted between the input shaft 5 and the shaft 2, said device as a whole being given the reference numeral 7. The device is incorporated in a housing 8 that includes on one hand a tubular wall 9 that is secured to a flange 10 by means of bolts 11 and on the other hand an end wall 12. The device according to the invention also includes a bellows being designated 13, said bellows 13 separating two different spaces inside the housing 8, i.e. a first space 14 in connection with the input shaft 5 and a second space 15 in connection with the valve spindle 2.

It should also be mentioned that the valve spindle 2 is surrounded by a conventional radial sealing 16.

Figure 2:
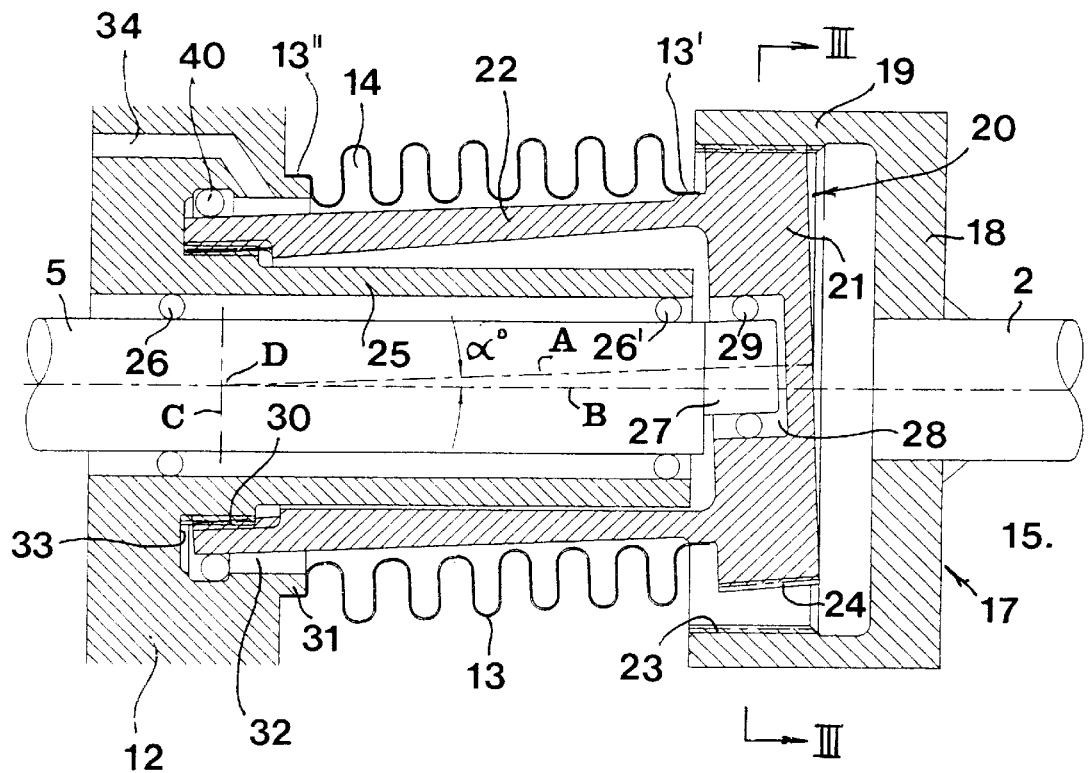
Figure 3:
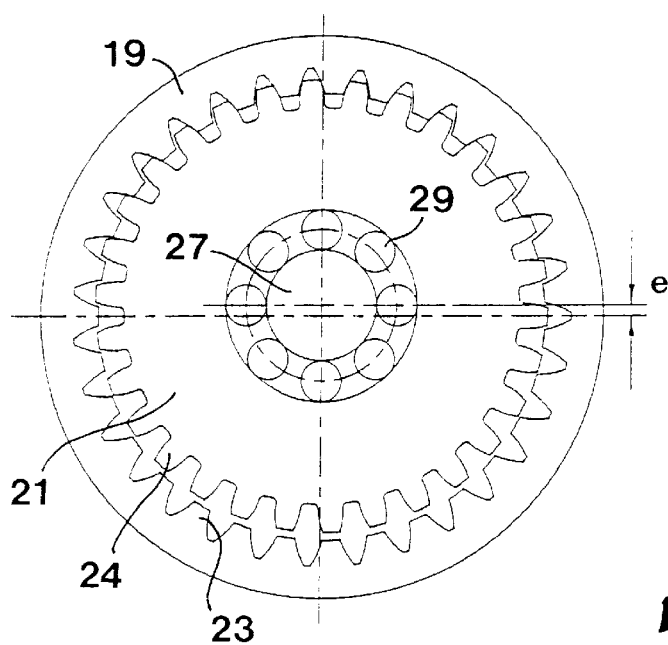

Reference is now made to FIGS. 2 and 3 that schematically illustrate a first embodiment of the invention. In FIG. 2 the device according to the invention is shown in a horizontal position where the end wall 12 is located to the left and forms a first stationary member, the shaft 5 being rotatable relative to said stationary member. Compared to the input, driving shaft 5 the valve spindle 2 is an output, driven shaft. It should be noted that said shaft 2 at its end is connected to a cover that in its entirety is designated 17, said cover being composed of a disc shaped wall 18 and an annular or tubular flange 19. The two spaces that are separated by means of the bellows 13 are shown at 14 and 15 respectively.

The main component of the device according to the invention is a transmission element that is generally designated 20. In the given example said transmission element 20 is composed on one hand of a disc 21 and on the other hand of a sleeve or sleeve-shaped member 22 that projects from said disc 21. A first outer gear ring 23 on the inside of the annular flange 19 is arranged to cooperate with a second, inner gear ring 24 on the periphery of the circular disc 21. Said two gear rings 23, 24 have different pitch diameters. The outer gear ring 23 has a certain number of inwardly directed teeth, while the inner gear ring 24 has a smaller number of outwardly directed teeth of which only a minor number, e.g. one, is in engagement with the outer gear ring 23. Said outer gear ring 23 is cylindrical in the given example (but could also be conical). The inner gear ring 24 is preferably conical. An axis of symmetry of the gear ring 24 is designated A. Said geometrical axis of symmetry is oblique at an angle A relative to the axis of symmetry B of the driving shaft 5.

From the inside of the end wall 12 a tube socket 25 extends, said driving shaft 5 being journalled, by the aid of a proper number of schematically disclosed bearings 26, 26', relative to the tube socket 25. At its inner end the driving shaft 5 has an eccentrically located portion 27 that engages a centric recess 28 in the gear disc 21. Said eccentrical portion 27 is preferably in the shape of a cylindrical spigot having its centre axis coaxially with the axis of symmetry A. The disc 21 is journalled relative to the eccentrical spigot 27 by means of a schematically disclosed bearing 29. The angle $\mu$ between the axes of symmetry A and B is in practice very small, e.g. in the interval 0,4–1,0°. Depending on the length of the sleeve 22 the eccentricity "ee" of the spigot 27, relative to the axis of symmetry B, could be in the magnitude of 0,3–0,6 mm. Thus in FIG. 2 the angle $\mu$ is shown too large for better clarity.

At its end directed away from the disc 21 the sleeve 22 is connected with the stationary member 12 by means of a coupling 30 that guarantees a non-rotative connection between said stationary member 12 and the transmission element 20 as a whole simultaneously as said connection allows the element 20 to perform a slewing or nutating motion. The coupling 30 is located in a plane C that extends perpendicular to the axis of symmetry B, said plane C intersecting said axis of symmetry B in a point D where also the axis of symmetry A intersects the axis of symmetry B. In practice the coupling 30 could be in the shape of a gear coupling or a ball spline coupling of the type described in SE 9404154-8.

Generally the bellows 13 forms a tubular or, in cross-section, annular separating means having its two opposite ends 13' and 13" respectively tightly secured to the element 20 and the stationary member 12 respectively. More precisely the end 13' is secured to the portion of the sleeve 22 that is closest to the disc 21 while the end 13" is secured to an annular flange 31 that partly defines an annular groove 32 in the end wall 12. Said groove 32 has a planar bottom 33, said sleeve 22 contacting said planar bottom 33, more precisely the contact is essentially in the shape of linear contact (in order to guarantee linear contact the end of the sleeve could be slightly conical). The attachment of the two ends of the bellows 13 against the sleeve 22 and the the annular flange 31 respectively is carried out in such a way that the bellows seals hermetically. In practice the bellows could be made out of metal, e.g. stainless steel, and the securing is effected by means of welding, brazing, deep rolling, gluing or the like.

The Function of the Device according to the Invention

When the driving shaft 5 is brought to rotate the eccentric spigot 27 and thus also the gear disc 21 will perform a planetary or arc-shaped motion around the central axis of symmetry B. This results in that the tooth or the few teeth of the inner gear ring 24 that engage the outer gear ring 23 will generate on the outer gear ring 23, the element 20 as a whole performing a nutating motion and the axis of symmetry A during said motion moving as a generatrix along an envelope surface of an imaginary cone, more precisely around the point D that forms a cone apex that is axially separated from the gear rings. During this nutating motion the transmission element 20 and its gear disc 21 does not rotate since the element 20 being non-rotatively connected to the stationary member 12 via the coupling 30. However, the result of the motion is that the cover 17 and also the shaft 2 are brought to rotate, more precisely in the same direction of rotation as the driving shaft and by a gear change that is dependent from the the difference between the number of teeth of the respective gear rings. If it is assumed that the number of teeth in the outer gear ring 23 is 101 and the number of teeth in the inner gear ring 24 is 100 then the gear change is 100:1, i.e. the shaft 2 moves $\frac{1}{100}$ revolution when the driving shaft 5 is rotated one revolution. The consequence of this large gear change is that very high torques can be transmitted from the shaft or valve spindle 2.

The benefits of the invention are several. Due to the small eccentricity of the gear disc 21 the bellows 13 will be subjected to very small deformations and thus if needed the bellows could be designed with a relatively substantial wall thickness, e.g. out of acidproof steel, and there is no risk that the tension in any member of the bellows reaches the fatigue limit. Thanks to the diminutive nutating motions of the gear disc it is possible to design the hermetically tight joints or seams at the ends 13', 13" of the bellows in a very reliable way and with a substantial length of life, said joints or seams being connected with the sleeve portion 22 and the gear ring 31 respectively. At the same time as the device according to the invention, by means of the bellows 13, is able to seal the two spaces 14 and 15 from each other in a very reliable way it is also guaranteed that high torques can be transmitted from the driving shaft to the valve spindle. If the disc 21 is subjected to a high pressure from a fluid in the space 15, said pressure is carried by the sleeve 22 without any axial compression of the bellows 13. Thus the free end of the sleeve 22 rests against the bottom 33 of the groove 32 and more precisely along a contact line that moves around the annular bottom surface syncronized with the nutating motion of the sleeve. This means that the bearings 26, 26' and 29 need to carry radial load only and no axial load.

Figure 4:
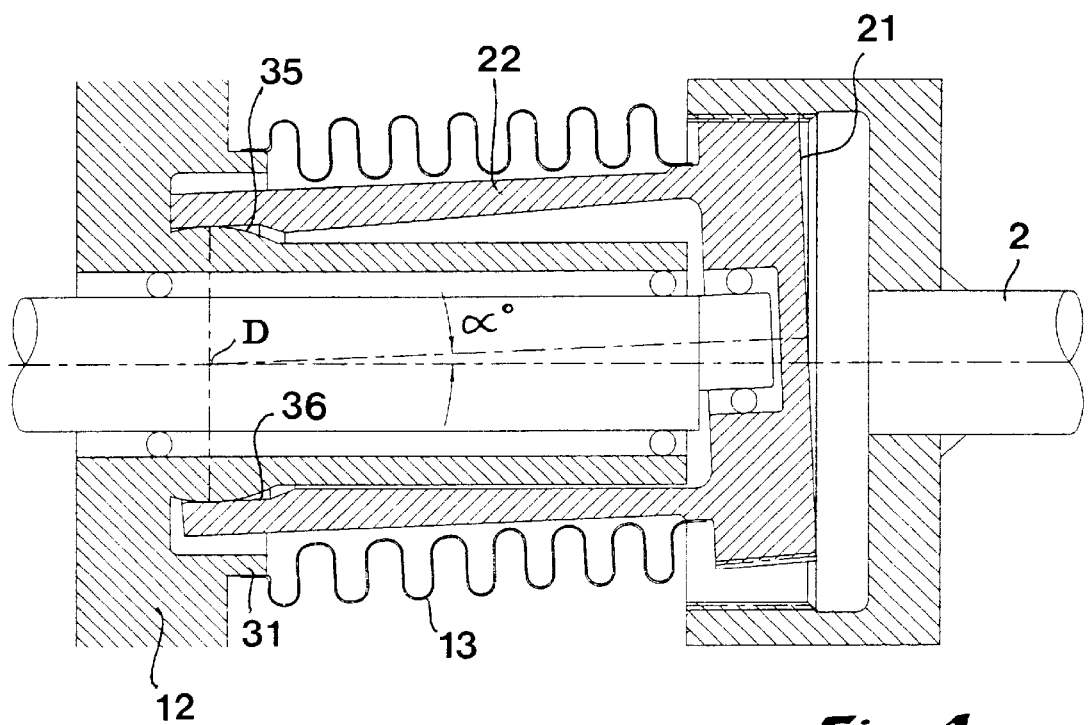

In FIG. 4 an alternative embodiment is shown where the coupling 30 according to FIG. 2 is omitted and replaced by a ball joint structure including a partly spherical bulge 35 having its centre located in the cone apex D. At its free end the sleeve 22 has an internal, cylindrical surface 36 that with fairly tight fit contacts the partly spherical surface of the bulge 35. This ball joint allows the sleeve and the adherent gear disc 21 to perform the nutating motion described above. Non-rotative connection between the stationary member 12 and the gear disc 21 is in this case guaranteed by means of the bellows 13 itself that thanks to the tubular shape has a substantial torsional stiffness, the bellows 13 at its opposite ends being fixedly connected with the annular flange 31 and the sleeve 22 respectively.

Figure 5:
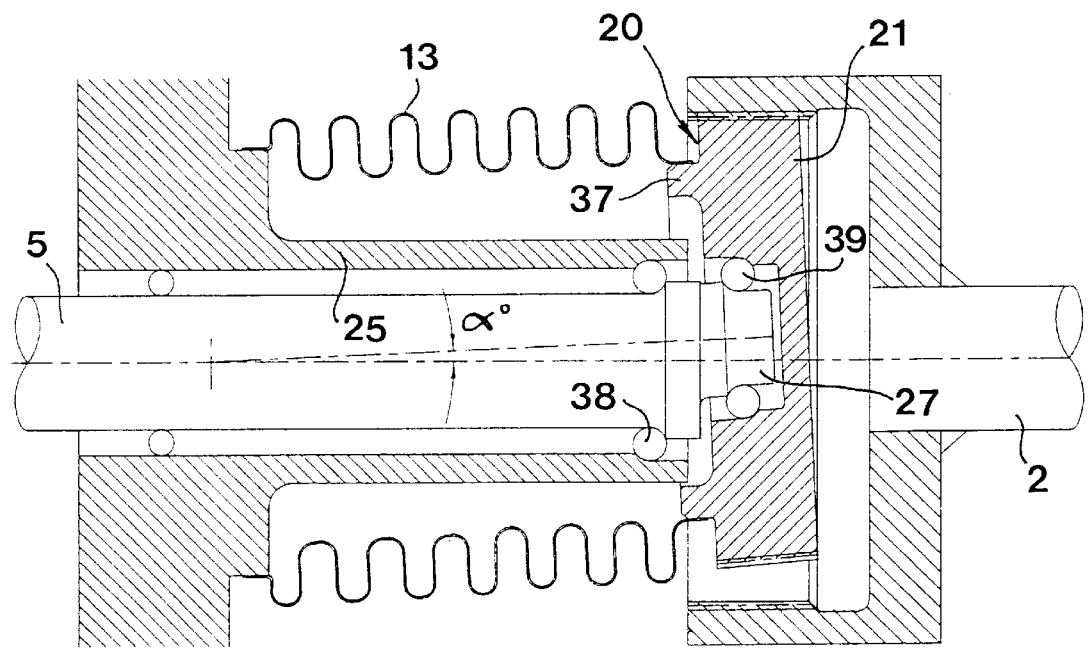
FIG. 5 is an analog longitudinal section showing a third embodiment.

In the embodiment according to FIG. 5 the transmission element 20 consists essentially of the gear disc 21 only, i.e. apart from an annular projection 37 there is no sleeve of the kind shown in FIGS. 2 and 4. The diminutive projection 37 serves as holder for the bellows 13. In this case the axial compressive forces that possibly act upon the gear disc 21 are carried by two bearings 38, 39, an additional object of said bearings 38, 39 being to journal the driving shaft 5 relative to the tubular portion 25 and the gear disc 21 relative to the eccentric spigot 27.

In theory it would be possible, instead of a conical inner gear ring having oblique axis of symmetry, to use a cylindrical inner gear ring that is eccentrically movable relative to the input shaft in a plane perpendicular to said shaft. In such a case the bellows would be imparted a S-shape during the eccentric movements of the gear disc. The bellows according to the invention has a simple arched shape when the gear disc with its conical gear ring performs its nutating motion. In practice this means among other things that for equal deformation stress upon the bellows a double torsional stiffness is achieved since the bellows will have only half the length compared to the S-shaped design and the overall structural length is thus shorter.

To maintain the conventional radial sealing 16 in connection with the valve spindle 2, as is shown in FIG. 1, is of advantage in that any sudden pressure changes may not occur in the space 15 between the sealing and the bellows. If in an extreme situation a crack would occur, in e.g. a welding in connection with the bellows, the radial sealing guarantees that large quantities of the fluid in question will not flow out in a forced flow. In other words the radial sealing guarantees that the quantity of possibly leaking fluid that by-passes a demolated bellows is small per time-unit.

As shown in FIG. 2 it is also possible that the device is completed with at least one further sealing 40, e.g. an O-ring. The pressure in the space between the bellows and the O-ring can be detected in a suitable way, e.g. by means of a pressure transmitter that gives warning if there is a pressure increase, i.e. the bellows is leaking.

In FIG. 1 it is further shown how a collar bearing 41 could be arranged on the outside of the annular flange 19 of the cover 17. In practice said bearing could be in the shape of a needle roller bearing that unrolls directly against the outside of the annular flange 19 and against a strip of hardened steel that is located in a turned groove in the tubular wall 9 of the surrounding housing 8.

Figure 6:
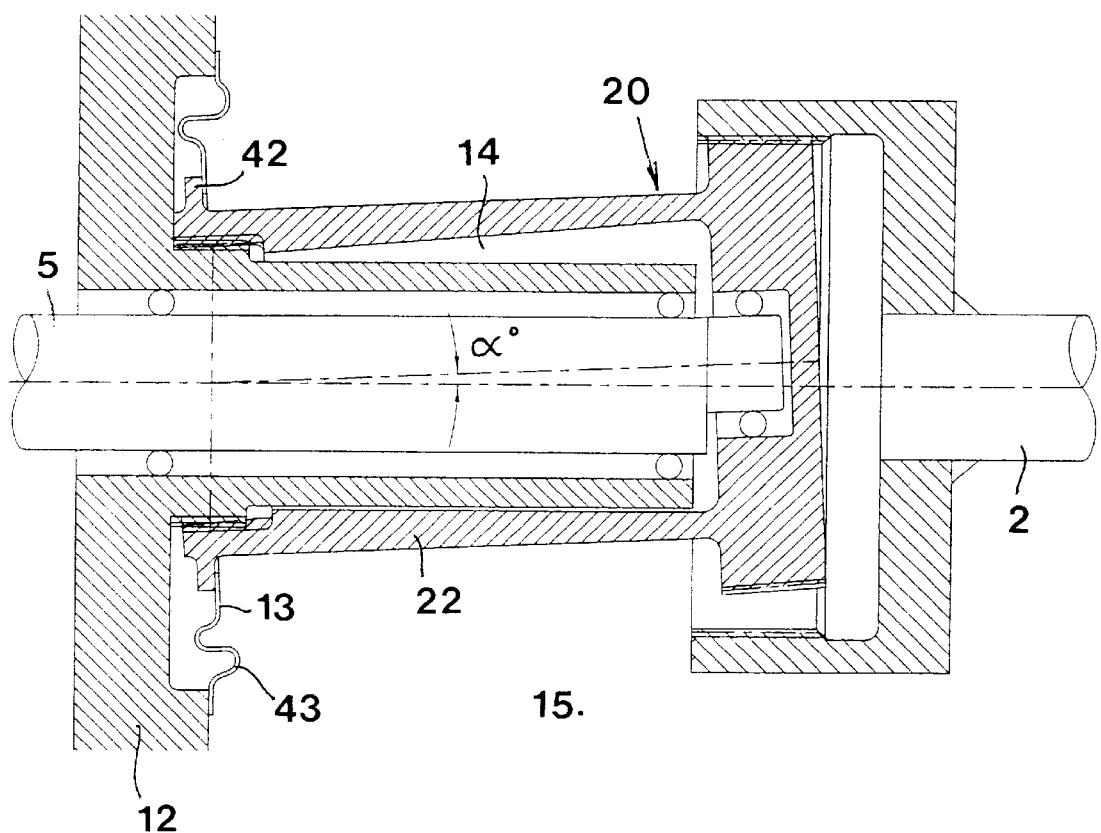
FIG. 6 is a longitudinal section showing a fourth embodiment.

According to the embodiment of FIG. 6 the separating means 13 consists of an annular, membrane-like disc that has its outer periphery secured to the stationary member 12 and its inner periphery to a flange 42 of the sleeve 22. In the area between its outer and inner edges the annular disc 13 has corrugations 43 that make the nutating motion of the transmission element possible.

Feasible Modifications of the Invention

The invention is not restricted only to the embodiments described and shown in the drawings. Thus it is possible to adapt the general scope of invention also for other applications than valve control. It is thus only essential for the invention that a torque is transmitted between two rotational elements simultaneously as the spaces holding these rotational elements are hermetically sealed or separated from each other. In this connection it should be emphazised that the force transmission could take place in reverse direction, i.e. the first shaft 5 could be an output shaft, while the second shaft 2 constitutes an input shaft. Further it is obvious that the input shaft could be driven in a different way than by a manually actuated driving means, e.g. an electric or other motor. It is neither necessary to use exactly a bellows as a barrier or separating means between the two spaces that are to be separated. Through suitable choice of material it is thus also possible to use a simple tube or even a simple annular disc of the type shown in FIG. 6. It should also be pointed out that the two gear rings 23, 24 preferably could have a helical line contact between the teeth in a way described in WO 95/07420. Also the input shaft 5 could be designed in a suitable way having a counterweight to balance the eccentric portion 27 and a part of the total nutating mass.

I claim:

1. A torque transmitting device, comprising, a rotational shaft (5) located in a first space (14) and rotatable relative to a stationary first member (12), and a rotational element (2) located in a second space (15) and rotatable relative to a stationary second member (1), a transmission element (20) operatively connected between said shaft and said rotational element and structured and arranged to impart rotation of one of said shaft and rotational element by rotation of the other of said shaft and rotational element, said transmission element (20) being non-rotatively connected with said first member 12 and comprising a disc having a centric recess, a separating member (13) connected to said first member (12) and said transmission element (20), said separating member (13) separating said first and second spaces, cooperating first and second gear rings (23,24) having different pitch diameters, said first gear ring being an outer gear ring (23) coupled to said rotational element, said outer gear ring comprising inwardly directed first teeth, and said second gear ring being an inner gear ring at an outer peripheral edge of said disc, said inner gear ring comprising outwardly directed second teeth, the diameter of said outer gear ring (23) being greater than the diameter of said inner gear ring (24), the number of said first teeth being greater than the number of said second teeth, and only a minor number of said second teeth being in engagement with said first teeth in an operative mode, said inner gear ring (24) having a first geometric axis of symmetry (A), and said outer gear ring (23), said shaft (5) and said rotational element (2) having a second geometric axis of symmetry (B), said first geometric axis of symmetry (A) being oblique relative to said second geometric axis of symmetry (B), one end of said shaft (5) comprising a portion (27) in engagement with said centric recess (28), said portion (27) being eccentric relative to said second geometric axis of symmetry (B), wherein in said operative mode, said inner gear ring (24) is eccentrically movable relative to said outer gear ring (23), and said first axis (A) has a nutating and generatrix motion along an imaginary envelope surface of a cone and around an apex (D) of said cone, said apex being axially separated from said outer and inner gear rings.

2. Device according to claim 1, wherein said portion (27) comprises a spigot (27) having a geometric centre axis co-axial with the first geometric axis of symmetry (A).

3. Device according to claim 1, further comprising a sleeve-shaped portion (22) extending from said disc to a free end, and further wherein said free end contacts the first member (12) thereby carrying axial compressive forces acting against the disc and preventing said forces from acting upon the separating member (13), in said operative mode.

4. Device according to claim 3, wherein the sleeve-shaped portion (22), at said free end, is connected with the first member (12) by a coupling (30) that is located essentially in the same transverse plane (C) as said cone apex (D), that said coupling guarantees the non-rotative connection between the first stationary member (12) and the inner gear ring (24) simultaneously as it is possible for the transmission element (20) to perform the nutating motion.

5. Device according to claim 1 further comprising a first bearing (38) that journals the shaft (5) relative to the first member, and a second bearing (39) that journals the disc (21) relative to the portion (27),, said first and second bearings comprising roller bearings structured and arranged to carry radial and axial loads.

6. Device according to claim 2 further comprising a sleeve-shaped portion (22) extending from said disc to a free end, and further wherein said free end contacts the first member (12) thereby carrying axial compressive forces acting against the disc and preventing said forces from acting upon the separating member (13), in said operative mode.

7. Device according to claim 1 wherein said separating member comprises a tube having a substantial axial extension.

8. Device according to claim 2, wherein said separating member comprises a tube having a substantial axial extension.

9. Device according to claim 3, wherein said separating member comprises a tube having a substantial axial extension.

10. Device according to claim 4, wherein said separating member comprises a tube having a substantial axial extension.

11. Device according to claim 6, wherein said separating member comprises a tube having a substantial axial extension.

12. Device according to claim 2 further comprising a first bearing (38) that journals the shaft (5) relative to the first member, and a second bearing (30) that journals the disc (21) relative to the portion (27),, said first and second bearings comprising roller bearings structured and arranged to carry radial and axial loads.

* * * * *